Jan. 10, 1939.　　　　　B. EICHWALD　　　　　2,143,768
RACK WIRING UNIT
Filed May 19, 1938
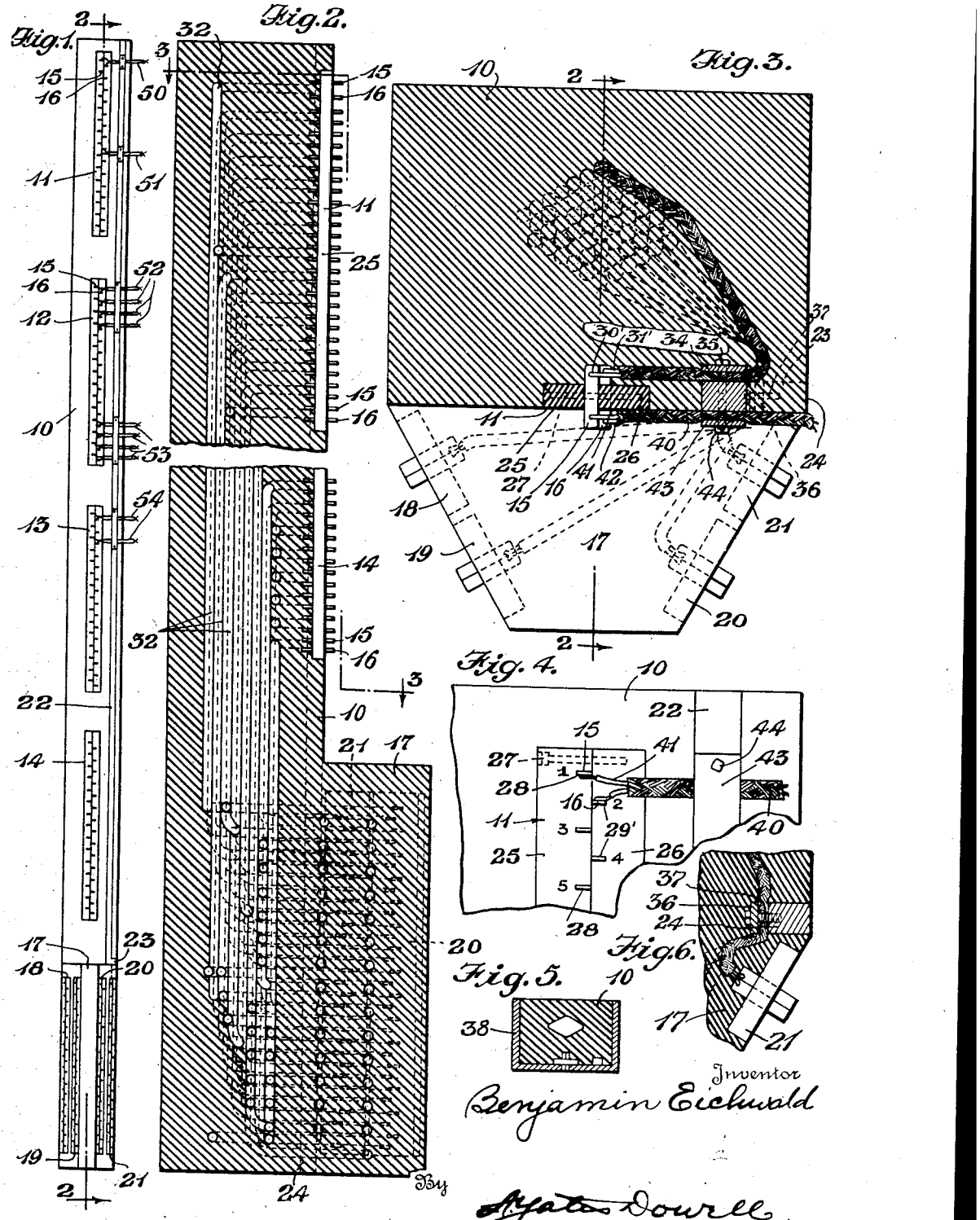
Inventor
Benjamin Eichwald
By
Ayats Dowell
Attorney Patented Jan. 10, 1939

2,143,768

UNITED STATES PATENT OFFICE 2,143,768

RACK WIRING UNIT

Benjamin Eichwald, Brooklyn, N. Y.

Application May 19, 1938, Serial No. 208,931

10 Claims. (Cl. 175—306)

This invention relates to a wiring unit for use with a rack having associated therewith radio, telephonic or other equipment.

The invention specifically contemplates the provision of a unit containing wires or electrical conductors permanently mounted in relatively fixed relation but with readily accessible exposed terminals, the unit being easily applied or removed, as well as modified to change any wiring plan or diagram.

Heretofore in installing electrical equipment the provision of the necessary electrical circuits and connections has been expensive and with more or less unsatisfactory results, on account of the fact that the conducting wires have been relatively movable and subject to vibration and also because it has been necessary to embody the mass of conducting wires in the rack in a manner to avoid, as far as possible, cross currents and other unsatisfactory effects which interfere with the operation of the devices associated with the rack.

Further, with constructions heretofore used, after completion of an installation it has been exceedingly difficult if not impossible to materially modify a wiring arrangement or several wiring arrangements without having to discard the complete wiring unit, due to the difficulty in mounting the numerous electrical conductors so that they do not shift, vibrate or move and thereby interfere with the operation of the devices associated with the rack.

Due to the care and exactness required in attempting to secure the wires in the proper manner with solid joints, it has been necessary, each time the wiring was changed or modified, to discard substantially the entire wiring unit. Consequently where installation costs have amounted for example to $250.00, it has been necessary to expend an additional $250.00 each time the wiring diagram was materially modified.

It is an object of the present invention to provide a rack wiring unit of simple, inexpensive and compact construction which may be easily applied or removed and in which the electrical circuits may be modified without creating electrical interferences or other undesirable effects.

Other objects and the nature and advantages of the invention will be apparent from the following description taken in conjunction with the accompanying drawing, wherein:

Fig. 1 is a front elevation illustrating a rack wiring unit in accordance with the present invention;

Fig. 2, an enlarged vertical section on the line 2—2 of Fig. 1;

Fig. 3, an enlarged section on the line 3—3 of Fig. 2;

Fig. 4, an enlarged fragmentary detail in front elevation near the upper end of the rack;

Fig. 5 illustrates a method of molding the unit; and

Fig. 6 is a fragmentary view in cross section showing the means whereby the sheaths are clamped to the bus bar at the lower end of the rack wiring unit.

In carrying out the invention, a wiring rack or unit is provided wherein the necessary wires or conductors are permanently and solidly fixed or embedded in a suitable material capable of being molded, such for example as hard rubber, "Bakelite" or other plastic or moldable composition, the conducting wires being shielded by a suitable conducting material such as copper fabric properly grounded to a common bus or ground to avoid undesirable sounds such as humming. The unit may include a series of terminal blocks of a particular construction exposed along the front of the unit with the terminals of each block arranged for easy access and properly identified for inter-connection.

Referring to the drawing in detail, in Fig. 1 is shown a preferred embodiment of the present invention comprising a molded body 10, having in the front surface thereof a plurality of group terminal blocks 11, 12, 13 and 14, each of which has exposed spaced electrical terminals 15 and 16 extending outwardly from the face of the said body. The lower end of the rack has an enlarged forwardly extending base portion 17 in which is mounted a plurality of terminal block members 18, 19, 20 and 21 of the same general construction as the terminal blocks 11 to 14 inclusive, which latter are mounted in the upper part of the rack unit. Extending vertically and flush with the outer surface of the body 10 is mounted a ground bus bar 22, which extends across the lower front face of the main body at 23 and along the lower side face of the unit as at 24.

Each terminal block comprises a separable unit of insulating material such as hard rubber or the like composed of two members 25 and 26 connected by fastening elements 27. Each member is provided with slots 28 and 29' respectively, which when the parts are secured together are arranged in staggered relation so that the terminal elements extending through each slot are in spaced relation with respect to adjacent terminal elements. All of the terminal blocks 11 to 14 inclusive and 18 to 21 inclusive are preferably constructed in this manner. Each terminal block may for example have a series of thirty terminals forming fifteen pairs of terminals. These terminals on the terminal blocks 11 to 14 inclusive may be numbered, respectively, from 1 to 30, 31 to 60, 61 to 90, 91 to 120 or they may be identified in any other appropriate manner. The terminals on the blocks 18 to 21 inclusive may be numbered or identified in the same manner so that the series of terminals on the block 11 will have a similar series of terminals marked in a similar manner on block 18 or 21, depending upon the arrangement which is found most expedient in use. For the purpose of illustration and this description the terminals on block 11 have been connected to those on block 21 at the base. All of these connections are internal connections and after being made, become permanent or fixed. Each pair of terminals, such as 1 and 2, 3 and 4, etc., on each pair of spaced terminal blocks are interconnected by a pair of insulated conductors 30' and 31', see for example Figs. 2 and 3. All of the remaining terminals are connected in the same manner, terminals numbered 31 and 32 on block 12 being connected to terminals numbered 31 and 32 of block 20, terminals numbered 61 and 62 of block 13 being connected to terminals numbered 61 and 62 of block 19, and terminals numbered 91 and 92 of block 14 being connected to terminals numbered 91 and 92 respectively of block 18.

Each pair of conductors is enclosed in a flexible electrically conducting sheath 32 made preferably of woven strands of copper. Each sheath is thereby flexible and serves to shield the circuits of the enclosed wires from the influence of adjacent conductors interconnecting other terminals. As observed in Fig. 3, each sheath and its enclosed conductors extend from the terminals 15 and 16 to the right and are secured to the rear of the bus bar 22 by appropriate conducting clamps 34 which are secured to the bus bar by bolts 35. The sheath then extends rearwardly to a position somewhat centrally of the body and then downwardly to the base section of the unit. After reaching the base section, the sheath 32 extends outwardly into the section of the base 17 carrying the conductors to the terminals in block 21. It will be observed that the sheath is again secured to the portion 24 of the bus bar by means of an appropriate plate 36 and fastening means 37. In this manner each end of the internal conductors of the unit is fastened to the ground bus so that the electrical characteristics of the unit are fixed due to the fact that the conductors themselves are held fixed.

After the conductors, terminals, terminal blocks and bus bar are tied together, the parts may be placed in an appropriate mold such as indicated at 38 in Fig. 5 and the body 10 formed of an appropriate plastic material by molding. Any appropriate plastic or composition material may be used, such as hard rubber, Bakelite or other synthetic resins. These materials in their plastic state may be poured into a mold in which has first been placed the bus bar, conductors, terminals, etc., as an assembly, and after the plastic material has solidified, the rack wiring unit is obtained. The parts are thus positively insulated and held fixed so that there can be no possible movement due to currents flowing in the conductors or other causes.

After the unit has been molded it may be utilized in the erection of a switchboard or other panel structure for radio, telephones, testing apparatus, etc. When the unit is installed, any arrangement of circuits may be obtained by securing similarly sheathed pairs of conductors to the exteriorly extending portion of the terminals and tying the sheaths to the external surface of the bus bar as in Fig. 4. In this figure a sheath 40 containing conductors 41 and 42 fastened to the upper two terminals of block 11 are all tied to the ground bus 22 by means of a conducting clamp 43, which is secured to the bus by bolts 44.

It will be observed that any set of connections may be arranged, as for example with conductors 50, 51, 52, 53 and 54 secured to various terminals on the upper blocks. These conductors may be connected to any appropriate apparatus and other or similar apparatus may be connected in the same manner to the lower terminals about the base of the unit. It will be readily understood, of course, that all of these sheathed conductors will be grounded to the ground bus.

It will be obvious to those skilled in the art that various changes may be made in this device without departing from the spirit of the invention and therefore the invention is not limited to what is shown in the drawing and described in the specification but only as indicated in the appended claims.

I claim:

1. A rack wiring unit comprising groups of spaced interconnected terminals, means shielding the interconnections, a ground bus arranged to effect grounding of the shielding means, the foregoing parts being embedded in a molded body with terminal ends exposed.

2. A rack wiring unit comprising a plurality of spaced terminal blocks each having a plurality of terminals, pairs of wires interconnecting pairs of terminals on pairs of said spaced blocks, flexible conducting sheaths encasing pairs of said wires, a ground bus, said sheaths being connected to said bus, and a moldable material holding said parts in fixed position.

3. A rack wiring unit comprising a plurality of spaced terminal blocks each having a plurality of terminals, pairs of wires interconnecting pairs of terminals on pairs of said spaced blocks, woven conducting sheaths encasing pairs of said wires, a ground bus, said sheaths being connected to said bus, and a moldable material holding said parts positively fixed against movement.

4. A rack wiring unit comprising spaced terminals interconnected by a sheathed pair of conductors, a bus bar ground member, and a molded body of plastic material retaining said parts in fixed position with the terminals and bus bar substantially flush with a surface of the body, said bus including means for grounding the sheaths.

5. A rack wiring unit comprising spaced terminals interconnected by a sheathed pair of conductors, a bus bar grounding the sheaths of said conductors, and a molded body of plastic material retaining said parts in fixed position with the terminals and bus bar substantially flush with a surface of the body.

6. A rack wiring unit comprising at least two spaced pairs of terminal elements interconnected by a pair of wires encased by a flexible conducting sheath, a ground bus electrically connected to said sheath, said parts being embedded in a body of molded plastic material with terminal ends exposed.

7. A rack wiring unit comprising at least two spaced pairs of terminal elements interconnected by a pair of wires encased in a woven copper sheath, a ground bus electrically connected to said sheath, said parts being held in fixed position by a body of molded plastic material with terminal ends exposed.

8. A rack wiring unit comprising at least two spaced pairs of terminal elements interconnected by a pair of wires encased by a woven conducting sheath, a ground bus electrically connected to said sheath, said parts being held fixed by a body of molded plastic material with terminal ends exposed.

9. A rack wiring unit comprising a plurality of spaced pairs of groups of terminals, pairs of insulated conductors interconnecting pairs of terminals of said spaced groups, conducting sheaths around said pairs of conductors, a ground bus, said parts being at least partly embedded in a body of material serving to hold the parts in fixed relation with terminal ends exposed, means interiorly of said body grounding said sheaths to said bus, and means for grounding and affixing sheaths of external connections to said bus.

10. A wiring unit comprising a block or body of solidified plastic material having embedded therein a group of conductors and exterior exposed terminals to which said conductors are connected with terminal ends exposed, a ground bus, and a sheath of conducting material encasing the external portions of said conductors and grounded to said bus.

BENJAMIN EICHWALD.